Nov. 2, 1937. C. W. GRIFFITH Re. 20,544

SHOOTING GALLERY

Original Filed Aug. 6, 1934 3 Sheets-Sheet 1

Witness
H Woodard

Inventor
C. W. Griffith
By H. B. Willson & Co
Attorneys.

Nov. 2, 1937. C. W. GRIFFITH Re. 20,544

SHOOTING GALLERY

Original Filed Aug. 6, 1934 3 Sheets-Sheet 2

Witness
H. Woodard

Inventor
C. W. Griffith
By H. B. Willson & Co
Attorneys.

Nov. 2, 1937. C. W. GRIFFITH Re. 20,544
SHOOTING GALLERY
Original Filed Aug. 6, 1934 3 Sheets-Sheet 3
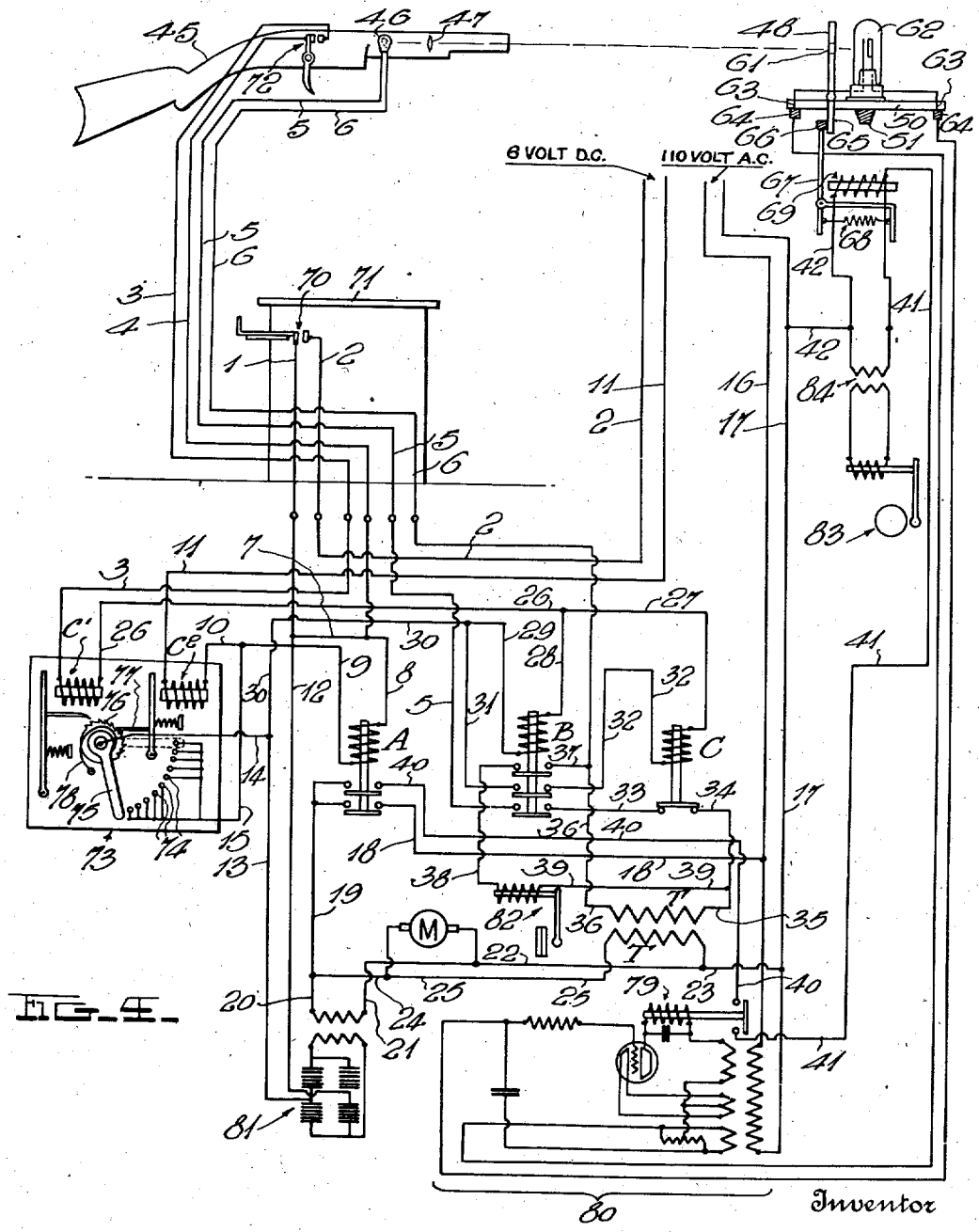
Witness
H. Woodard
Inventor
C. W. Griffith
By H. B. Willson & Co
Attorneys.

Reissued Nov. 2, 1937

Re. 20,544

UNITED STATES PATENT OFFICE 20,544

SHOOTING GALLERY

Charles W. Griffith, Tulsa, Okla., assignor, by mesne assignments, to Rayolite Rifle Range Company, Tulsa, Okla., a corporation of Oklahoma Original No. 2,007,083, dated July 2, 1935, Serial No. 738,767, August 6, 1934. Application for reissue February 23, 1937, Serial No. 127,181

30 Claims. (Cl. 273—101.1)

The invention aims to provide a new and improved shooting gallery in which a flash of light is projected from a gun upon pulling of the trigger, to operate a signal if the aim be accurate, through the instrumentality of a photo-electric cell and amplifier.

Another object is to provide novel means for driving a traveling target until the gun trigger has been pulled a predetermined number of times and for then discontinuing operation of the entire gallery. The target driving means and the bulb illuminating means are preferably initially conditioned for operation by means of a coin switch and the person shooting is permitted to "fire" a predetermined number of shots for the coin he inserts.

A still further object is the provision of unique means for breaking the bulb circuit a fraction of a second after illumination of the bulb, preventing the user from making attempts to focus the light beam upon the photo-electric cell after a "shot" has been fired.

A still further object is to make provision for moving the target portion at which the gun was aimed to a "struck" position if the aim be accurate.

Yet another object is to associate a plurality of electrical units in a novel and advantageous way to attain the desired ends.

With the foregoing in view, the invention resides in the novel subject matter hereinafter described and claimed, description being accomplished by reference to the accompanying drawings.

Fig. 2 is a perspective view showing the various electrical elements mounted upon the target base, this view being shown from a point opposite that from which Fig. 1 is viewed.

Fig. 3 is a vertical transverse sectional view through the upper portion of the traveling target showing one of the movably mounted target drop portions, the photo-electric cell associated therewith, and the means for effecting movement of said target drop portion to a "struck" position if the aim of the gun be so accurate as to cause the light flash to strike the photo-electric cell.

Fig. 4 is a diagram showing the gun, the target, the various electrical units and the preferred wiring.

Figure 1:
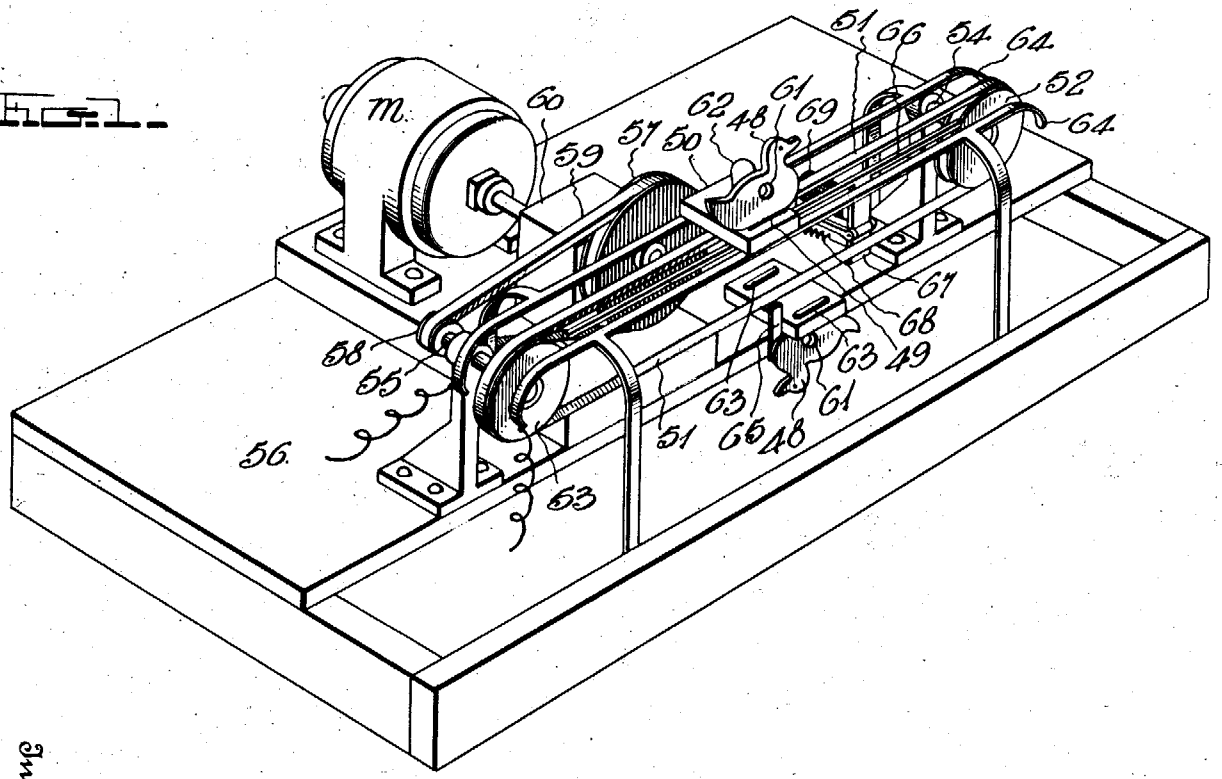
Fig. 1 is a perspective view showing the traveling target, its driving means and its supporting base. The motor is shown mounted upon this base and while various other electrical units used in carrying out the invention may also be mounted upon said base, they have been omitted from Fig. 1 for clearness.
Figures 1, 2:
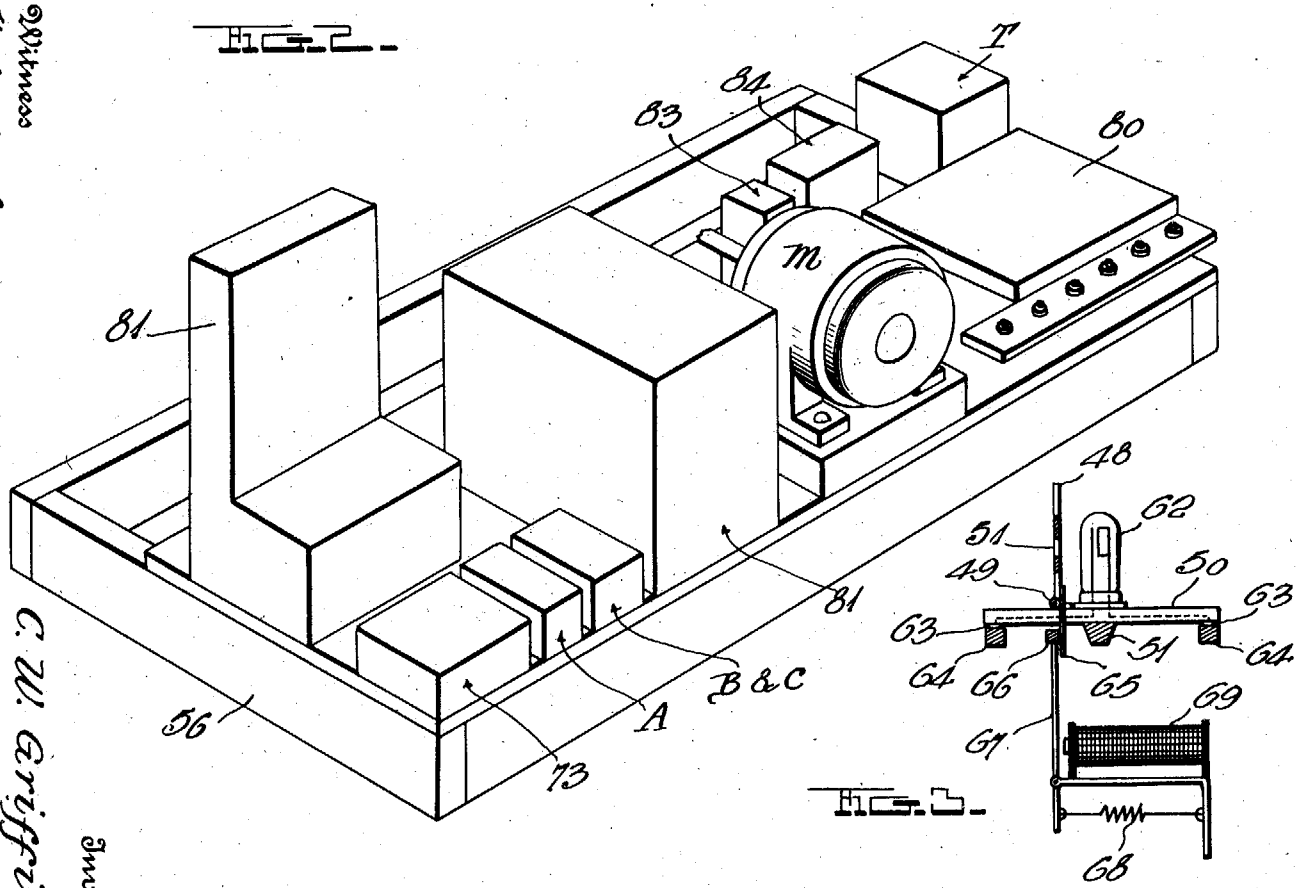

The gallery includes a gun 45 having an electric light bulb 46 and a lens 47 for projecting a beam of light toward a target. In the present disclosure, this target is of the traveling type and is provided with a plurality of target drop portions 48 which may simulate ducks, said target drop portions being pivoted at 49 upon bases 50 which are secured to an endless belt 51. Belt 51 is trained around pulleys 52 and 53 whose shafts 54 and 55 are suitable mounted upon a base 56. An electric motor M is mounted on the base 56 to drive one of the belt pulleys to effect travel of the target drop portions 48 and in the present showing, pulleys 57 and 58, a belt 59 and a transmission 60, transmit power from said motor M to the shaft 55. Each target drop portion 48 is formed with an opening 61 and mounted on the base 50 behind said opening, is a photo-electric cell 62. If the person practicing directs the light flash from the bulb 46 through the opening 61 against the cell 62, the target drop portion 48 associated with said cell, drops, and at the same time an additional signal may be operated, all of which will be hereinafter fully explained.

Each base 50 carries contacts 63 for its cell 62 and said contacts are co-operable with fixed contact rails 64 and with other means hereinafter described to effect dropping of the target drop, and if desired, operation of the signal.

Each target drop portion 48 is equipped with an arm 65 and during travel of said target drop portion with the upper reach of belt 51, said arm lies against a trip rail 66 which is carried by an arm 67 hingedly mounted on the base 56, and, when the parts are in the position shown in Figure 3, holds the target drop 48 upright. A spring 68 holds arm 67 in normal position and a "duck drop" electro-magnet 69 is provided to swing said arm 67, causing rail 66 to strike or move the arm 65 and cause the target drop portion 48 to drop. The electro-magnet 69 becomes energized only when the flash of light from the bulb 46 is so accurately aimed as to strike the photo-electric cell 62.

In addition to electrical contrivances so far mentioned, various other electrical units and wiring therefor are employed and will now be described, and said units may well be mounted on the base 56.

70 denotes a coin slot starting switch located at the shooting post 71, for bringing the motor M into play to drive the target, and for preparing the entire gallery for operation.

72 refers to a trigger switch carried by the gun 45 and serving primarily to illuminate the bulb 46.

73 refers to a normally open shot limit switch which controls the number of shots which may be "fired" upon insertion of one coin in switch 70. This limit switch 73 includes a series of contacts 74, a contact arm 75 co-operable with said contacts, ratchet means 76 for advancing said arm 75 step by step along the contacts 74, an actuating coil C' for actuating said ratchet means 76, a detent 77 for holding said ratchet means after each operation thereof, a reset coil $C^2$ for releasing said detent 77, and a spring 78 for moving the contact arm 75 to a closed starting position when detent 77 is released.

The reference character A, denotes a two pole relay which stands normally open; B has reference to a three pole relay which also stands normally open; and C refers to a third and normally closed relay.

79 refers to a photo-electric relay and 80 to photo-electric amplifying means. T denotes a transformer, 81 refers to a rectifier and 82 indicates a thud sounder for imitating the report of a gun. 83 denotes a bell and 84 a transformer therefor, both optional.

The various electrical units above described are operatively connected with each other and with two current sources, 6 volt D. C. and 110 volt A. C., by means of wiring to which the numbers 1 to 42 have been applied. All of the wiring will be clear from Fig. 4 and the following explanation of operation, without encumbering the description with an individual statement concerning each wire and such surplusage is therefore omitted.

When the device is not in use, all parts stand as seen in Fig. 4, the contact arm 75 of limit switch 73 being then beyond the series of contacts 74. When a person wishes to use the device, the first act is the placing of coin in coin slot of switch 70 which completes circuit from 6 volt source along wire 2 through coin slot switch 70, along wire 1 to 7 to 8 through actuating coil of relay A along wire 9 to 10 through reset coil $C^2$ in shot limit switch, along wire 11 back to 6 volt source. When coil $C^2$ is thus energized, it releases detent 77 and spring 78 swings contact arm 75 to the closed starting or "home position" seen in dotted lines in Fig. 4. The current through the actuating coil of relay A causes the circuits to be completed across contacts which causes current from 110 volt source to flow from wire 16 to 18 through relay contacts to 19 to 20 through primary coil or rectifier to 21 to 22 to 23 to 17 to 110 volt source. Wire 24 connects to wire 19—20 which connects to motor M allowing current to flow through motor to wire 21—22—23—17 to 110 volt source. From wire 24 current also flows to wire 25 which connects to transformer T allowing current to flow through primary winding of transformer T to 23 to 17 to source.

Current flowing through primary coil in rectifier 81 by inherent construction of rectifier, presents a source of 30 volt D. C. current at wires 12 and 13. Contact arm 75 of shot limit switch 73 now being in "home position", current flows from 13 to 14 through shot limit switch to 15 to 9 through actuating coil of relay A to 8 to 7 connecting to wire 1—12, to newly established 30 volt source at rectifier 81.

When relay A is first energized, current can flow through relay contacts from 19 to 40 which lead to photo-electric relay 79. This current does not flow, however, until relay 79 is closed by photo-electric cell 62 through amplifier 80, etc.

Summarily then, the placing of coin in slot switch 70 returned shot limit switch to "home position" closed relay A, which put rectifier 81 in service, started motor M which started target moving, and provided a 6 volt A. C. source of current from transformer T at wires 35 and 36.

It might be well to point out that while the original actuating current for relay A comes from 6 volt source, as soon as rectifier 81 begins to operate and shot limit switch 73 is in "home position", relay A is held in closed position by the current from said rectifier 81 until current is interrupted by shot limit switch 73.

The gallery is now ready for the actual shooting operation. When trigger switch 72 on gun 45 is pulled, current flows from rectifier 81 along wire 12 to 7 to 4, through trigger switch 72 to 3 through actuating coil C' in shot limit switch 73 to 26 to 28 through actuating coil of relay B to 29 to 30 to 13 to source. Energizing coil C' in shot limit switch 73, as previously explained, moves contact arm 75 one position.

Closing of relay B completed 3 circuits thus: 1. From 6 volt A. C. source at transformer T current flows through 35 to 34 across contacts in relay C to 33 across contacts in relay B to 5 to light bulb 46 in gun to 6 to 36 to source. 2. From 30 volt source at rectifier 81 current flows along wire 12 to 7 to 4 through gun trigger switch 72 to 3 through coil C' in shot limit switch to 26 to 27 through actuating coil of relay C to 32 across contacts in relay B to 31 to 30 to 13 to source. 3. From 6 volt source at transformer T along 35 to 39 through actuating coil of thud sounder 82 to 38 across contacts at relay B to 37 to 36 to source.

The first of these three newly completed circuits illuminates the light 46 in gun 45. The second causes relay C to open, breaking circuit to the light 46. The fact that relay C is so adjusted as to cause it to operate a fraction of a second slower than relay B allows light to flash for an instant only. The third of these circuits completed causes the thud to sound. If the aim of the gun has not been accurate no further action takes place. If the aim is such that the flash of light from bulb 46 contacts photo-electric cell 61 current flows from amplifying unit 80 through cell 62 and rails 64 causing photo-electric relay 79 to operate. This allows 110 volt A. C. current from contacts at relay A to flow along wire 40 through photo-electric relay 79 to 41 through magnet 69 to 42 to 17 to source. If bell 83 and transformer 84 are connected, the flow of current in the primary of transformer 84 is simultaneous with that in coil 69, and causes bell 83 to sound when the drop 48 falls.

When the trigger of the gun has been pulled ten times, the contact arm of shot limit switch 73 no longer completes circuit 14 to 15. Breaking this circuit causes relay A to break 110 volt circuit which causes rectifier 81 to cease functioning, motor M to stop and transformer T to cease operation. The gallery then is "dead", ready for another sequence of events as just described.

It will be observed that the energy for the actuation of the target drop mechanism and of the audible signal 83 comes from an outside source of 110 volt alternating current through a circuit including the lines 16 and 17. It will be further observed that this circuit is controlled by the relay 79 which is energized from the amplifier 80. When I use the term "actuate" in the specification and claims, I wish it to be understood as meaning "to put in action" or "to cause to be put in action".

While excellent results are attainable from the construction shown and described and such construction may be considered as preferred, variations may of course be made within the scope of the invention as claimed.

It will be noted that the gun used in my combination is entirely supported by the operator. He treats it, handles it and uses it just as any ordinary gun is used, the only connection between the gun and any other part of the mechanism is the light flexible electric cable which terminates in the gun mechanism. The gun can be laid down, picked up, moved around, manipulated without any reference whatever to any of the working working mechanisms outside of the gun.

The switch and trigger combination in the gun is so set up that a single pull on the trigger causes a single flash of light only to be projected. Whether the operator holds the trigger or not makes no difference. Nothing but a single flash is projected, as distinguished from a continuous beam, so that if the gun is not aimed at the target at the instant the flash is projected, subsequent correction of the aim makes no difference. It is this flash arrangement and this entire portability of the gun which makes my device different from other non-bullet target shooting devices because it enables the user to do exactly what he would do if he were firing a bullet.

I claim:—

1. In a shooting gallery including a source of electric current, a traveling target having a photo-electric cell, means energized from said current source for moving said target, a photo-electric amplifier, means operatively connecting said cell and amplifier, said connecting means including stationary contact means, and traveling contact means engaging said stationary means and movable with the target, signal means actuated by the current from said amplifier, if said cell be struck by a light flash, a manually aimed gun including a source of light for projecting a light flash toward the target, and circuit connections between said current source and said light source for energizing the latter.

2. A shooting gallery comprising a traveling target, a driving motor for said target, a gun having an electric light source for projecting a flash of light at said target, a trigger switch on said gun for effecting completion of a circuit through said light source, means for establishing a circuit for said motor including a shot limit switch having electrical actuating means which must be successively operated to finally open said shot limit switch, and a circuit for said electrical actuating means controlled by said trigger switch.

3. A shooting gallery comprising a traveling target, a driving motor for said target, a gun having an electric light source for projecting a light flash at said target, a trigger switch on said gun for effecting completion of a circuit for said light source, means for establishing a circuit for said motor including a normally open relay, a starting switch for energizing said relay to operate the motor, a shot limit switch which remains closed during operation of the gallery, means including said shot limit switch for maintaining a circuit to hold said relay closed as long as said shot limit switch remains closed, and means for automatically advancing said shot limit switch toward a final open position each time said trigger switch is operated.

4. A shooting gallery comprising a traveling target, a driving motor for said target, a gun having an electric light source for projecting a light flash at said target, a trigger switch on said gun for effecting completion of a circuit for said light source, means for establishing a circuit for said motor including a normally open relay and a normally open shot limit switch which must be initially moved to a closed starting position, said shot limit switch having a reset coil for moving it to said starting position, a starting switch for completing a circuit through the actuating coil of said relay and through said reset coil to move said shot limit switch to closed position and operate the motor, means including said shot limit switch for maintaining a circuit through said relay as long as said shot limit switch remains closed, and means for automatically advancing said shot limit switch toward open position each time said trigger switch is operated.

5. A shooting gallery comprising a traveling target; a driving motor for said target; a gun having a light source for directing a light flash at said target; a trigger switch on said gun; a normally open shot limit switch having an actuating coil for advancing it toward its open position, and a reset coil for returning it to a closed starting position; a normally open relay connected to complete a circuit for said motor; a starting switch connected to direct current through said reset coil and through the actuating coil of said relay to reset said shot limit switch at starting position and to close said relay to operate the motor; means including said relay for directing a circuit through said shot limit switch and through the actuating coil of said relay to hold the latter closed as long as said shot limit switch remains closed; a second normally open relay; a third and normally closed relay; said second relay being connected to direct current through said light source and said third relay and to direct current through the actuating coil of said third relay to break the light circuit; said trigger switch being connected to direct current through said actuating coil of said shot limit switch to advance the latter toward open position and to direct current through the actuating coil of said second relay to operate the motor and energize the actuating coil of said third relay; said third relay being adjusted to lag behind said second relay before opening to break the light circuit.

6. A shooting gallery comprising a traveling target; a driving motor for said target; a gun having a light source for directing a light flash at said target; a trigger switch on said gun; a normally open shot limit switch having an actuating coil for advancing it toward its open position, and a reset coil for returning it to a closed starting position; a normally open relay connected to complete a circuit for said motor; a starting switch connected to direct current through said reset coil and through the actuating coil of said relay to reset said shot limit switch at starting position and to close said relay to operate the motor; means including said relay for directing a circuit through said shot limit switch and through the actuating coil of said relay to hold the latter closed as long as said shot limit switch remains closed; a second normally open relay; a third and normally closed relay; said second relay being connected to direct current through said light source and said third relay and to cooperate with the aforesaid trigger switch to direct current through the actuating coil of said third relay to break the light circuit; said trigger switch being connected to direct current through said actuating coil of said shot limit switch to advance the latter toward open position and to direct current through the actuating coil of said second relay to operate the motor and energize the actuating coil of said third relay; said third relay being adjusted to lag behind said second relay before opening to break the light circuit.

7. A shooting gallery comprising a traveling target; a driving motor for said target; a gun having a light source for directing a light flash at said target; a trigger switch on said gun; a normally open shot limit switch having an actuating coil for advancing it toward its open position, and a reset coil for returning it to a closed starting position; a rectifier and a transformer; a normally open relay for actuating said rectifier and transformer and operating said motor; a switch connected to direct current through said reset coil and through the actuating coil of said relay to reset said shot limit switch at starting position and to close said relay, causing the latter to actuate said rectifier, said transformer and said motor; means for directing a circuit from said rectifier through said shot limit switch and the actuating coil of said relay to hold the latter closed as long as said shot limit switch remains closed; a second normally open relay; a third and normally closed relay; said second relay being connected to direct current from said transformer through said light source and said third relay and to direct current from said rectifier through the actuating coil of said third relay; said trigger switch being connected to direct current from said rectifier through said actuating coil of said shot limit switch to advance the latter toward open position and to direct current from said rectifier through the actuating coil of said second relay to operate the motor and energize the actuating coil of said third relay, said third relay being adjusted to lag behind said second relay before opening to break the light circuit.

8. A shooting gallery comprising a traveling target; a driving motor for said target; a gun having a light source for directing a light flash at said target; a trigger switch on said gun; a normally open shot limit switch having an actuating coil for advancing it toward its open position, and a reset coil for returning it to a closed starting position; a rectifier and a transformer; a normally open relay for actuating said rectifier and transformer and operating said motor; a switch connected to direct current through said reset coil and through the actuating coil of said relay to reset said shot limit switch at starting position and to close said relay, causing the latter to actuate said rectifier, said transformer and said motor; means for directing a circuit from said rectifier through said shot limit switch and the actuating coil of said relay to hold the latter closed as long as said shot limit switch remains closed; a second normally open relay; a third and normally closed relay; said second relay being connected to direct current from said transformer through said light source and said third relay and to co-operate with said trigger switch to direct current from said rectifier through the actuating coil of said third relay; said trigger switch being connected to direct current from said rectifier through said actuating coil of said shot limit switch to advance the latter toward open position and to direct current from said rectifier through the actuating coil of said second relay to operate the motor and energize the actuating coil of said third relay, said third relay being adjusted to lag behind said second relay before opening to break the light circuit.

9. A shooting gallery comprising a movable target and means for moving the target, a "drop" operatively associated with the target, means for releasably holding the "drop" in raised position, said drop being provided with an aperture, a light-sensitive cell carried by the target and movable therewith, said cell being aligned with said aperture and positioned to be struck by a flash of light accurately directed at the target, said drop holding means including means operatively connecting the same with said light-sensitive cell whereby when a flash of light impinges on said cell the holding means is actuated to release the "drop" to indicate a hit.

10. A shooting gallery comprising a movable target and means for moving the target, a "drop" operatively associated with the target, means for releasably holding the "drop" in raised position, said target being provided with an aperture, a light-sensitive cell carried by the target and movable therewith, said cell being aligned with said aperture and positioned to be struck by a flash of light accurately directed at the target, a gun having a light source for projecting a flash of light, trigger mechanism for controlling the light source, shot limiting means associated with the gun, means effective to deenergize the target moving means in response to a predetermined number of operations of the trigger, said drop holding means including means operatively connecting the same with said light-sensitive cell whereby when a flash of light from the gun impinges on said cell the holding means is actuated to release the "drop" to indicate a hit.

11. A shooting gallery comprising a traveling target, a driving motor for said target, a gun, a trigger on said gun, means for establishing a circuit for said motor, a shot limit switch having electrical actuating means which must be successively operated to finally open said shot limit switch, a circuit for said electrical actuating means, and means for controlling said last mentioned circuit in response to the pulling of said trigger by the operator.

12. A shooting gallery comprising a movable target and means for moving the target, said target including a drop member, means for holding the drop member in raised position, said drop member being provided with an aperture, a light sensitive cell associated with the target and movable therewith, said cell being alined with said aperture, and being positioned to be struck by a flash of light accurately directed at the target, and means for actuating said drop holding means for causing said drop member to fall when a flash of light impinges on said cell.

13. A shooting gallery comprising a movable target and means for moving the target, said target including a drop member, means for normally holding the drop member in raised position, said drop member being provided with an aperture, a light sensitive cell associated with the target and movable therewith, said cell being alined with said aperture, and being positioned to be struck by a flash of light accurately directed at the target, and means for actuating said drop holding means for causing said drop member to fall when a flash of light impinges on said cell, including an electrically operable member adapted to move said drop member toward hit indicating position.

14. In a shooting gallery including a source of electric current, a traveling target which includes a target base, means energized from said current source for moving the target, a photoelectric cell mounted on and moving with said base, and a target drop pivoted to said base, a photoelectric amplifier, means operatively connecting said cell and said amplifier, including stationary contact means and traveling contact means engaging such stationary means and movable with said target base, signal means, and means for actuating said signal means in response to the flow of current from said amplifier if said cell be struck by a light flash, and a manually aimed gun including a source of light for projecting a light flash toward the target, and circuit connections between said current source and said light source.

15. In a shooting gallery including a source of electric current, a traveling target which includes a target base, means energized from said current source for moving the target, a photoelectric cell mounted on and moving with said base, a target member movable with said base, a photoelectric amplifier, means operatively connecting said cell and said amplifier, including stationary contact means and traveling contact means engaging such stationary means and movable with said target base, signal means, means for actuating said signal means in response to flow of current from said amplifier if said cell be struck by a light flash, and a manually aimed gun including a source of light for projecting a light flash toward the target, circuit connections between said current source and said light source.

16. In a shooting gallery including a source of electric current, a traveling target which includes a target base, means energized from said current source for moving the target, a photoelectric cell mounted on and moving with said base, a target drop pivoted to said base, a photoelectric amplifier, means operatively connecting said cell and said amplifier, including stationary contact means and traveling contact means engaging such stationary means and movable with said target base, signal means, means for actuating said signal means in response to flow of current from said amplifier if said cell be struck by a light flash, and a manually aimed gun including a light source for projecting a light flash toward the target, circuit connections between said current source and said light source said target drop being apertured, and said cell being alined with said aperture.

17. In a shooting gallery including a source of electric current, a movable target structure, means energized from said current source for moving the target, a target drop movably mounted on said structure, means for normally holding said drop in raised position, a light sensitive cell positioned to be struck by a beam of light accurately directed upon the target, aimable means including a source of light for directing a flash of light toward said target, circuit connections between said current source and said light source and means for actuating said drop holding means for causing the target drop to fall when a flash of light reaches said cell.

18. In a shooting gallery, a source of electric current, a movable target structure, means energized from said source of current for moving the target, a target drop movably mounted on said structure, means for normally holding said drop in raised position, a light sensitive cell positioned to be struck by a beam of light accurately directed upon the target, aimable means including a source of light for directing a flash of light toward said target, circuit connections between said current source and said light source, means for causing the target drop to fall when a flash of light reaches said cell, including an electro-magnetic coil, and means for energizing it when a flash of light reaches said cell, and an armature adapted to be moved in response to the energization of said coil, said drop holding means being controlled by said armature for causing movement of said drop.

19. In a shooting gallery a source of electric current, a movable target structure, means energized from said source of current for moving the target, a target drop movably mounted on said structure, means for normally holding said drop in raised position, a light sensitive cell positioned to be struck by a beam of light accurately directed upon the target, aimable means including a source of light for directing a flash of light toward said target, circuit connections between said current source and said light source, means for causing the target drop to fall when a flash of light reaches said cell, including an electro-magnetic coil, means for energizing it when a flash of light reaches said cell, an armature adapted to be moved in response to the energization of said coil, said drop holding means being controlled by said armature for causing movement of said drop, a source of current for said coil, a circuit including said source and said coil, an amplifier, an operative connection between said amplifier and said cell, and means for closing said circuit in response to flow of amplifier current.

20. In a shooting gallery a source of electric current, a movable target structure, means energized from said source of current for moving the target, a target drop movably mounted on said structure, means for normally holding said drop in raised position, a light sensitive cell being positioned to be struck by a beam of light accurately directed upon the target, aimable means including a source of light for directing a flash of light toward said target, circuit connections between the current source and said light source, means for causing the target drop to fall when a flash of light reaches said cell, including an electromagnetic coil, means for energizing it when a flash of light reaches said cell, an armature adapted to be moved in response to the energization of said coil, said drop holding means being controlled by said armature for causing movement of said drop, a source of current for said coil, a circuit including said source and said coil, an amplifier, an operative connection between said amplifier and said cell, and means for closing said circuit in response to flow of amplifier current, including a relay and means for energizing it from said amplifier.

21. In a shooting gallery a source of electric current, a movable target structure, means energized from said source of current for moving the target, a target drop movably mounted on said structure, means for normally holding said drop in raised position, a light sensitive cell being positioned to be struck by a beam of light accurately directed upon the target, aimable means including a light source for directing a flash of light toward said target, circuit connections between said current source and said light source, and means for actuating said drop holding means for causing the target drop to fall when a flash of light reaches said cell, said cell being mounted on and moving with said target structure.

22. In a shooting gallery a source of electric current, a movable target structure, means energized from said source of current for moving the target, a target drop movably mounted on said structure, means for normally holding said drop in raised position, a light sensitive cell positioned to be struck by a beam of light accurately directed upon the target, aimable means including a source of light for directing a flash of light toward said target, circuit connections between the current source and said light source, and means for actuating said drop holding means for causing the target drop to fall when a flash of light reaches said cell, said cell being mounted on and moving with said target structure, said target drop being apertured in line with said cell.

23. A target apparatus comprising a movable target member and means for moving it along a predetermined path, an apertured target drop member movably mounted on said movable member, a photo-sensitive cell mounted on and movable with said movable member and alined with the aperture in said target drop member, and means for causing said target drop member to drop when said photo-sensitive cell is struck by a flash of light.

24. A target apparatus comprising a target base, an apertured target member movably mounted on said base, a photo-sensitive cell mounted on said base and alined with the aperture in said target member, and means for causing said target member to move when said photosensitive cell is struck by a flash of light.

25. A target apparatus including a target, means for moving it transversely of the line of vision of the marksman, including a motor and a circuit for said motor, a photosensitive cell mounted on and moving with said target, a gun including a light source adapted to direct a flash of light toward the target, a trigger for said gun, means for controlling said light source in response to the pull of said trigger, and means for breaking said motor circuit in response to a predetermined number of trigger pulls.

26. In a shooting gallery including a source of current, a gun having a light source for projecting a light flash, energizing circuit connections between said current source and said light source, a control circuit including a trigger switch on said gun, a first relay having normally open relay contacts, a second relay having normally closed relay contacts, said normally open and said normally closed relay contacts being included in the energizing circuit for the light source, said trigger switch when closed being connected to energize said first relay to close the normally open contacts thereof and thereby close the circuit to the light source, said first mentioned relay being connected when energized to direct current through said second mentioned relay to energize the same and open the normally closed contacts thereof to break the circuit to said light source, said second mentioned relay being adjusted to lag behind said first mentioned relay before opening and breaking the light circuit.

27. In a target apparatus, a target member, means for moving said target, a photosensitive element operatively associated with the target, a gun having a light source adapted to direct a flash of light at said target, a trigger switch on the gun for controlling said light source, control means for rendering said target moving means inoperative in response to a predetermined number of movements of said trigger switch, and means operatively connecting the trigger switch and said control means.

28. A target apparatus including a target, means for moving it transversely of the vision of the marksman, including a motor, a photosensitive cell mounted on and moving with the target, a gun including a light source adapted to direct a flash of light toward the target, a trigger for said gun, means for controlling said light source in response to the pull of said trigger, and means for rendering said motor inoperative in response to a predetermined number of trigger pulls.

29. A shooting gallery comprising a movable target, means for moving the target, a gun, a trigger on said gun, means for actuating the target moving means, a control circuit, a shot limit switch having electrical actuating means which must be successively operated to finally open said shot limit switch, a circuit for said electrical actuating means and means for energizing said last mentioned circuit in response to operation of the trigger.

30. A shooting gallery comprising a movable target, means for moving the target, a gun, a trigger on said gun, means for actuating the target moving means, a control circuit for said actuating means, a shot limit switch, means for biasing said switch to an initial closed position, electrical actuating means for the shot limit switch which must be successively operable to move the switch step by step against said biasing means towards open position and finally open the switch, a circuit for said electrical actuating means, means for energizing said last mentioned circuit in response to operation of the trigger, and means for returning the shot limit switch to initial position.

CHARLES W. GRIFFITH.